United States Patent
Coolidge

(10) Patent No.: US 12,442,396 B2
(45) Date of Patent: Oct. 14, 2025

(54) VALVE WITH AN ADJUSTABLE FLOW SHARING PRESSURE COMPENSATOR

(71) Applicant: Parker-Hannifin Corporation, Cleveland, OH (US)

(72) Inventor: Gregory Thomas Coolidge, Elyria, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 224 days.

(21) Appl. No.: 17/768,639

(22) PCT Filed: Nov. 11, 2020

(86) PCT No.: PCT/US2020/059920
§ 371 (c)(1),
(2) Date: Apr. 13, 2022

(87) PCT Pub. No.: WO2021/154369
PCT Pub. Date: Aug. 5, 2021

(65) Prior Publication Data
US 2024/0102495 A1 Mar. 28, 2024

Related U.S. Application Data

(60) Provisional application No. 62/966,077, filed on Jan. 27, 2020.

(51) Int. Cl.
*F15B 13/04* (2006.01)
(52) U.S. Cl.
CPC ...... *F15B 13/0418* (2013.01); *F15B 13/0417* (2013.01); *F15B 2211/30535* (2013.01)

(58) Field of Classification Search
CPC ........ F15B 13/0418; F15B 2211/30535; F15B 11/05; F15B 11/07; F15B 11/165;
(Continued)

(56) References Cited

U.S. PATENT DOCUMENTS 2,729,242 A * 1/1956 Olson ................. F15B 13/0402
251/33
3,142,077 A * 7/1964 Nickell .................... B23G 1/16
251/74
(Continued)

FOREIGN PATENT DOCUMENTS

CN 202132300 U * 2/2012
DE 39 15 652 A1 11/1990
(Continued)

OTHER PUBLICATIONS

International Search Report and Written Opinion prepared by the European Patent Office in international application No. PCT/US2020/059920 dated Mar. 1, 2021.

*Primary Examiner* — Craig J Price
(74) *Attorney, Agent, or Firm* — McDonnell Boehnen Hulbert & Berghoff LLP

(57) ABSTRACT

An example pressure compensator valve includes: a compensator spool; a first piston coupled to a distal end of, and axially-movable with, the compensator spool; a second piston disposed at a proximal end of the compensator spool, wherein the compensator spool is axially movable relative to the second piston; and a compensator spring applying a biasing force on the compensator spool.

7 Claims, 11 Drawing Sheets

(58) Field of Classification Search
CPC .. F15B 11/065; F15B 11/168; F15B 13/0403;
F15B 13/0417; F15B 13/0444; G05D
16/106; F16K 3/24; F16K 1/02; F16K
3/00; F16K 31/04; E02F 9/2232; Y10T
137/87169; Y10T 137/87185
USPC ............ 137/115.14, 115.21, 115.23, 115.06,
137/115.07, 596.13, 596.12, 625–625, 5,
137/625.6, 596; 91/471, 463, 446, 448,
91/384, 472, 447; 60/422, 426
See application file for complete search history.

(56) References Cited

U.S. PATENT DOCUMENTS

| | | | | |
|---|---|---|---|---|
| 3,234,957 A * | 2/1966 | Allen | ................ | F15B 13/0417 |
| | | | | 91/461 |
| RE26,338 E * | 1/1968 | Allen | ................ | F15B 13/0417 |
| | | | | 137/115.07 |
| 3,363,649 A * | 1/1968 | Schott | ................ | B62D 5/07 |
| | | | | 137/625.69 |
| 3,777,773 A * | 12/1973 | Tolbert | ................ | F15B 13/0417 |
| | | | | 137/596.13 |
| 3,807,443 A * | 4/1974 | Jacobs | ................ | F15B 13/0417 |
| | | | | 137/493 |
| 3,863,448 A * | 2/1975 | Purdy | ................ | F15B 13/0417 |
| | | | | 91/518 |
| 3,895,703 A * | 7/1975 | Schmitt | ................ | B62D 11/08 |
| | | | | 192/12 C |
| 3,949,847 A * | 4/1976 | Hoehn | ................ | F16H 61/14 |
| | | | | 192/3.3 |
| 3,984,979 A * | 10/1976 | Budzich | ................ | F15B 13/04 |
| | | | | 91/462 |
| 3,990,352 A * | 11/1976 | Nishida | ................ | B66D 1/44 |
| | | | | 137/625.69 |
| 3,998,134 A * | 12/1976 | Budzich | ................ | F15B 13/0842 |
| | | | | 137/596.1 |
| 4,196,588 A * | 4/1980 | Johnson | ................ | F15B 11/17 |
| | | | | 137/87.03 |
| 5,025,625 A * | 6/1991 | Morikawa | ................ | F15B 11/162 |
| | | | | 91/518 |
| 5,577,534 A * | 11/1996 | Ward | ................ | G05D 16/2097 |
| | | | | 137/596.17 |
| 5,651,390 A * | 7/1997 | Ishihama | ................ | E02F 9/2225 |
| | | | | 91/518 |
| 5,778,929 A | 7/1998 | Ishizaki et al. | | |
| 5,813,309 A | 9/1998 | Taka et al. | | |
| 5,894,860 A * | 4/1999 | Baldauf | ................ | F16H 61/0251 |
| | | | | 137/596.17 |
| 5,937,645 A | 8/1999 | Hamamoto | | |
| 6,135,149 A | 10/2000 | Nozawa et al. | | |
| 6,196,247 B1 * | 3/2001 | Knoell | ................ | F15B 11/0445 |
| | | | | 137/625.68 |
| 6,223,773 B1 * | 5/2001 | Knoell | ................ | A01B 63/1013 |
| | | | | 137/625.68 |
| 8,479,769 B2 * | 7/2013 | Rub | ................ | F15B 13/08 |
| | | | | 91/446 |
| 8,646,338 B2 * | 2/2014 | Taddia | ................ | F15B 13/0417 |
| | | | | 73/856 |
| 8,939,173 B2 | 1/2015 | Yahr et al. | | |
| 9,027,589 B2 * | 5/2015 | Coolidge | ................ | F15B 13/026 |
| | | | | 137/488 |
| 9,874,884 B2 | 1/2018 | Knapper | | |
| 10,001,147 B2 * | 6/2018 | Kleitsch | ................ | F15B 11/162 |
| 10,100,496 B2 * | 10/2018 | Taddia | ................ | F15B 13/0417 |
| 10,281,934 B2 * | 5/2019 | Coolidge | ................ | F15B 11/165 |
| 10,287,751 B2 * | 5/2019 | Mori | ................ | E02F 9/2292 |
| 10,323,762 B2 * | 6/2019 | Janecke | ................ | F16K 17/22 |
| 10,989,232 B2 * | 4/2021 | Rost | ................ | F15B 13/00 |
| 11,067,101 B2 * | 7/2021 | Slattery | ................ | F15B 11/165 |
| 11,781,573 B2 * | 10/2023 | Slattery | ................ | F15B 21/12 |
| | | | | 137/624.14 |
| 11,852,249 B2 * | 12/2023 | Riva | ................ | F16K 31/1221 |
| 2015/0013319 A1 * | 1/2015 | Buettner | ................ | F15B 13/024 |
| | | | | 60/422 |
| 2016/0032566 A1 * | 2/2016 | Taddia | ................ | F15B 11/162 |
| | | | | 60/463 |
| 2017/0108015 A1 * | 4/2017 | Kleitsch | ................ | F15B 11/006 |

FOREIGN PATENT DOCUMENTS

| | | |
|---|---|---|
| EP | 2 980 416 A1 | 2/2016 |
| JP | 2018128063 A | 8/2018 |

* cited by examiner

VALVE WITH AN ADJUSTABLE FLOW SHARING PRESSURE COMPENSATOR

CROSS REFERENCE TO RELATED APPLICATION

The present application claims priority to U.S. Provisional Application No. 62/966,077, Jan. 27, 2020, which is hereby incorporated by reference in its entirety.

BACKGROUND

Hydraulic machinery commonly includes one or more main flow control valves, which can include directional control valves. A main flow control valve is a fluid valve that is operated directly or indirectly by an external input command.

Each main flow control valve can include a main flow control spool that is operated in response to the input command to control fluid flow and pressure to one or more associated hydraulic fluid receiving devices of the machinery. The hydraulic fluid receiving devices can include one or more hydraulic storage devices such as tanks or accumulators, hydraulic linear or rotary actuators, other hydraulic valves or subsystems, and/or any other devices that receive hydraulic fluid.

In examples, the machinery can include a plurality of main flow control valves for supplying and/or operating different hydraulic actuators in a hydraulic system of the machinery. A main flow control valve and its associated controls can be incorporated into a valve housing, and each such valve assembly is referred to as a worksection. Worksections of the same or different configuration may be combined, for example in a side-by-side arrangement. A worksection combined with other sections (for example, other worksections, an inlet section, and an outlet section) can be referred to as an assembly of valve sections.

A worksection operates by controlling the cross-sectional area of a main flow control valve variable area orifice. In examples, the main control valve variable orifice is located in a fluid flow path extending between an inlet passage and an outlet passage, or workport. The inlet passage may be connected directly or indirectly to a source of fluid flow and pressure, and the outlet passage may be connected directly or indirectly to one or more of the hydraulic actuators. The flow through a given main valve orifice area is dependent upon the pressure drop across the orifice. If the pressure drop across the orifice changes, the fluid flow through the orifice can vary for the same size of orifice.

Further, when a single actuator is actuated by an operator, the amount of flow going to the actuator can be proportional to a command provided by the operator, e.g., through a joystick or a lever. However, when multiple actuators are actuated simultaneously, the flow provide by a source of fluid (e.g., a pump) is divided between the multiple actuators. The actuator subjected to the smallest load might receive the highest amount of flow as fluid seeks the path of least resistance. However, this can lead to unpredictable, undesirable performance as the amount of fluid provided to a particular actuator is no longer proportional to the command provided by the operator.

It may thus be desirable to have a valve where proportionality between the command provided by the operator and the amount of flow to a particular actuator is maintained even when multiple actuators are actuated at the same time.

It is with respect to these and other considerations that the disclosure made herein is presented.

SUMMARY

The present disclosure describes implementations that relate to a valve with an adjustable flow sharing pressure compensator.

In a first example implementation, the present disclosure describes a pressure compensator valve. The pressure compensator valve includes: (i) a compensator spool; (ii) a first piston coupled to a distal end of, and axially-movable with, the compensator spool; (iii) a second piston disposed in a cavity formed at a proximal end of the compensator spool, wherein the compensator spool is axially movable relative to the second piston; and (iv) a compensator spring applying a biasing force on the compensator spool.

In a second example implementation, the present disclosure describes a worksection of a valve assembly. The worksection includes: (i) a worksection body having (a) a longitudinal bore, (b) an inlet cavity configured to receive fluid from a source of fluid, (c) a workport configured to be fluidly coupled to an actuator, (d) a regulated flow passage, and (e) a metered flow passage; (ii) a main control spool axially movable in the longitudinal bore to shift between (a) a neutral position at which the main control spool is configured to block fluid flow from the regulated flow passage to the metered flow passage and from the metered flow passage to the workport, and (b) a shifted position at which the main control spool is configured to permit fluid flow thereacross from the regulated flow passage to the metered flow passage and from the metered flow passage to the workport; and (iii) a pressure compensator valve located downstream from the inlet cavity and upstream from the main control spool and configured to regulate fluid flow from the inlet cavity to the main control spool, wherein the pressure compensator valve comprises: (a) a compensator spool configured to be subjected to a first fluid force in a proximal direction applied by fluid in the regulated flow passage and a second fluid force in a distal direction applied by fluid in the metered flow passage when the main control spool is in the shifted position, (b) a first piston coupled to a distal end of, and axially movable with, the compensator spool and configured to be subjected to a third fluid force in the proximal direction by a load-sense signal, wherein the compensator spool is configured to be subjected to a fourth fluid force in the distal direction applied by fluid from the inlet cavity, (c) a second piston disposed in a cavity formed at a proximal end of the compensator spool, wherein the compensator spool is axially movable relative to the second piston, and (d) a compensator spring applying a biasing force on the compensator spool.

In a third example implementation, the present disclosure describes a valve assembly. The valve assembly includes: (i) a plurality of worksections, each worksection configured to control fluid flow to and from a respective actuator, wherein the plurality of worksections comprise: (a) an inlet flow passage traversing the plurality of worksections and configured to provide inlet flow from a source of fluid to the plurality of worksections, and (b) a load-sense passage traversing the plurality of worksections and configured to communicate a load-sense signal that represents highest load-induced pressure among respective actuators controlled by the plurality of worksections; and (ii) a pressure compensator valve disposed in a worksection of the plurality of worksections, wherein the worksection comprises a regulated flow passage, a metered flow passage, and a main control spool configured to control fluid flow from the regulated flow passage to the metered flow passage based on an axial position of the main control spool within the worksection, wherein the pressure compensator valve is configured to regulate fluid flow from the inlet flow passage to the regulated flow passage, wherein the pressure compensator valve comprises: (a) a compensator spool configured to be subjected to a first fluid force in a proximal direction applied by fluid in the regulated flow passage and a second fluid force in a distal direction applied by fluid in the metered flow passage when the main control spool is shifted within the worksection, (b) a first piston coupled to, and axially movable with, the compensator spool and configured to be subjected to a third fluid force in the proximal direction by the load-sense signal, wherein the compensator spool is configured to be subjected to a fourth fluid force in the distal direction applied by fluid from the inlet flow passage, (c) a second piston disposed at a proximal end of the compensator spool, wherein the compensator spool is axially movable relative to the second piston, and (d) a compensator spring applying a biasing force on the compensator spool.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

Figure 1:
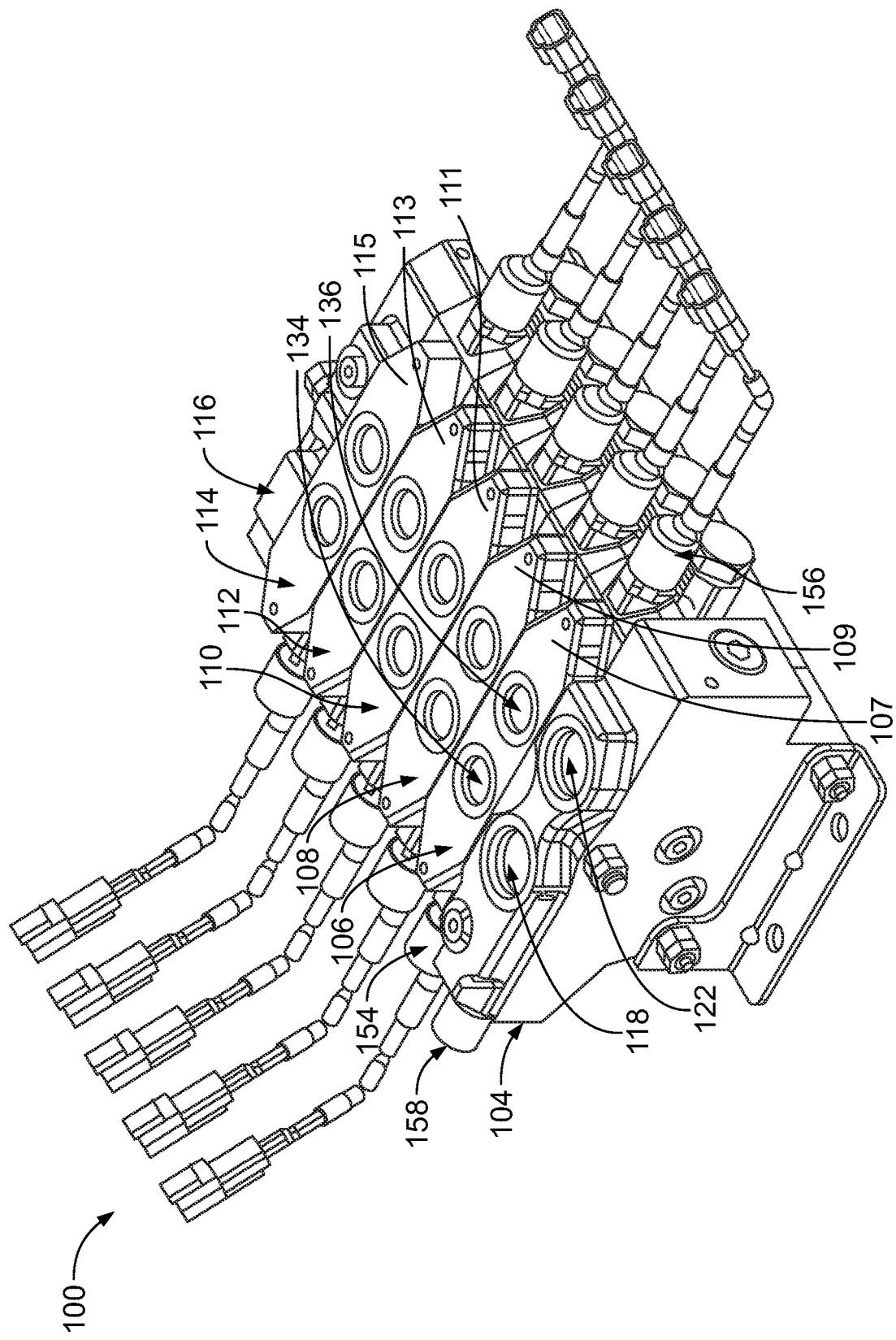
FIG. 1 illustrates a valve assembly, in accordance with an example implementation.

In certain applications, hydraulic fluid flow in a hydraulic machine can be controlled using hydraulic sectional control valves. A sectional control valve or valve assembly can include a plurality of separate cast and machined metal valve worksections. Each worksection may include internal fluid passages, external ports, and valve bores with valve members slidably disposed within each valve bore. The valve bores may include a main control valve spool bore in which a main directional control valve spool is slidably disposed. Each worksection may be configured to control flow of fluid to and from a hydraulic actuator of the hydraulic machine.

A pressure compensated worksection is a worksection that includes a pressure compensator valve arranged to maintain a substantially predetermined pressure drop across the main control valve variable orifice under normal operating flow conditions independently of the inlet or outlet pressure. By maintaining this substantially constant pressure drop across the orifice, a constant and repeatable flow rate through the orifice is achieved for any orifice area that is determined by the input command. Pressure compensated worksections such as those described above may, for example, be a pre-compensated working section including a pressure compensator valve located prior to (or upstream of) the main valve variable orifice.

Worksections can also include load-sense passages. The load-sense passages can be configured to transmit a pressure feedback signal from an outlet passage, which indicates the fluid pressure required by the fluid flow receiving device controlled by the valve. The load-sense passage can be operably connected to a load sensing variable displacement hydraulic pump or other load sensing source of pressure and flow to provide a feedback signal to the source. Further, an outlet passage's pressure feedback signal may be connected to a pressure compensator spool of the pressure compensator valve. The pressure compensator valve then operates to maintain the predetermined pressure drop by sensing the downstream (or outlet passage) and upstream pressures across the variable orifice.

In some cases, multiple worksections are actuated at the same time (when main spools of the respective worksections are actuated simultaneously), and the total amount of fluid requested by all worksections can exceed the flow capacity of the source of fluid (e.g., the pump). In these cases, the pressure compensator valve of each section can operate to maintain pressure drop locally (for the respective section including the pressure compensator) across the main spool of the worksection without being "aware" of loads experienced by the other worksections. As such, the worksection controlling an actuator having the lowest load can allow a larger amount of fluid flow to the worksection compared to the other worksections as fluid seeks a path of least resistance. This may cause the actuator controlled by such worksection to move faster than the other actuators controlled by the other worksections.

In other words, the amount of fluid flow and speed of a given actuator may no longer be proportional to a position of the main spool within the worksection. Rather, the amount of fluid flow to a worksection depends on the loads that the other actuators are subjected to. Such loss of proportionality and predictability may be undesirable.

It may thus be desirable to have a valve where the pressure compensator valve of each worksection responds, not only to local load to which the actuator associated with the worksection is subjected to, but also to the highest load-induced pressure amongst all actuators. This way, the pressure compensator valves can respond together such that when multiple worksections are actuated simultaneously, the amount of fluid flow to each actuator can be reduced proportionally when the source of fluid (e.g., the pump) cannot provide the amount of fluid flow collectively requested by all the actuators. This configuration may be referred to as "flow sharing" where the actuators proportionally share the flow from the source regardless of the loads to which the different actuators are subjected to.

Disclosed herein are systems, valve sections, and valve assemblies that achieve flow sharing between multiple worksections of a valve. Particularly, the compensator spool of a pressure compensator is subjected to at least four pressure signals: (i) a first signal representing pressure level of regulated fluid flow provided from the pressure compensator valve to the main control spool of the worksection, (ii) a second signal representing local load (i.e., load-sense signal indicative of load-induced pressure generated by the load to which the actuator controlled by the worksection is subjected to), (iii) a third signal representing the highest load-induced pressure generated by the highest load amongst all actuators operating at the same time, and (iv) a fourth signal representing inlet pressure of the source of fluid (e.g., the pump). As such, each compensator spool responds, not only to local pressure condition of the particular worksection, but to "global" pressure conditions of other worksections as well. This leads to proportional variation of fluid and sharing of fluid flow provided by the source among all worksections. The term "local" is used herein to indicate that a parameter pertains to a particular worksection in the valve assembly, whereas the term "global" is used to indicate the highest value of the parameter among all worksections of the valve assembly.

Additionally, disclosed herein is a configuration of at least one pressure compensator of a particular worksection where the pressure compensator spool is further subjected to a biasing force of a compensator spring in addition of four fluid forces resulting from the four pressure signals mentioned above. Such biasing force can increase the amount of fluid flow of the particular worksection compared to the other worksections. Further, the compensator spring can enhance compensator efficiency of the particular worksection by reducing the effects of flow forces acting on the pressure compensator spool. Additionally, the biasing force of the compensator spring can be adjusted by an adjustment mechanism to adjust the flow division between the multiple worksection, i.e., give one worksection flow priority or equalize flow between multiple worksections actuated at the same time.

Figure 2:
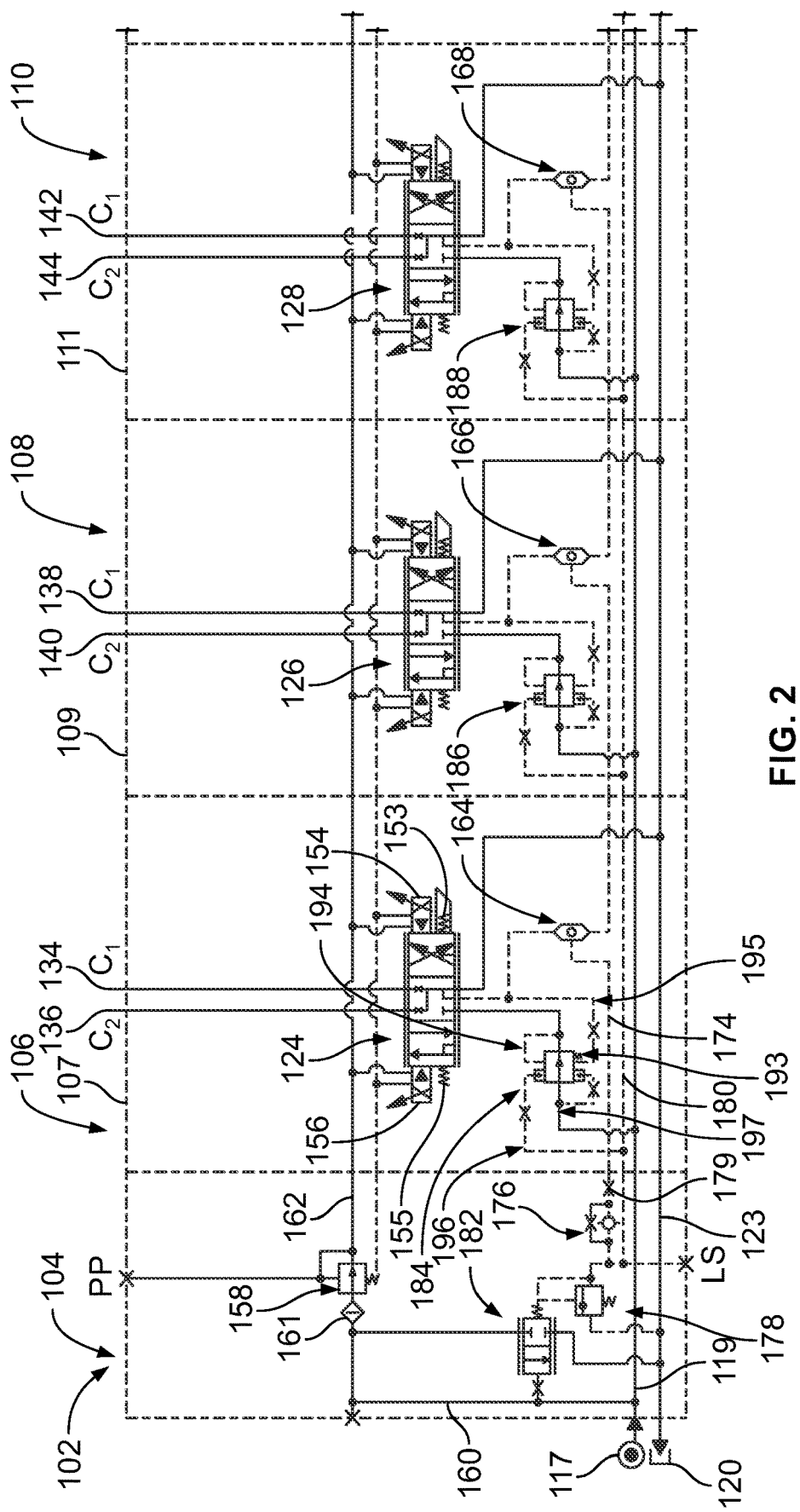
FIG. 2 illustrates a schematic of a hydraulic system that includes the valve assembly of FIG. 1, in accordance with an example implementation.
Figure 2:
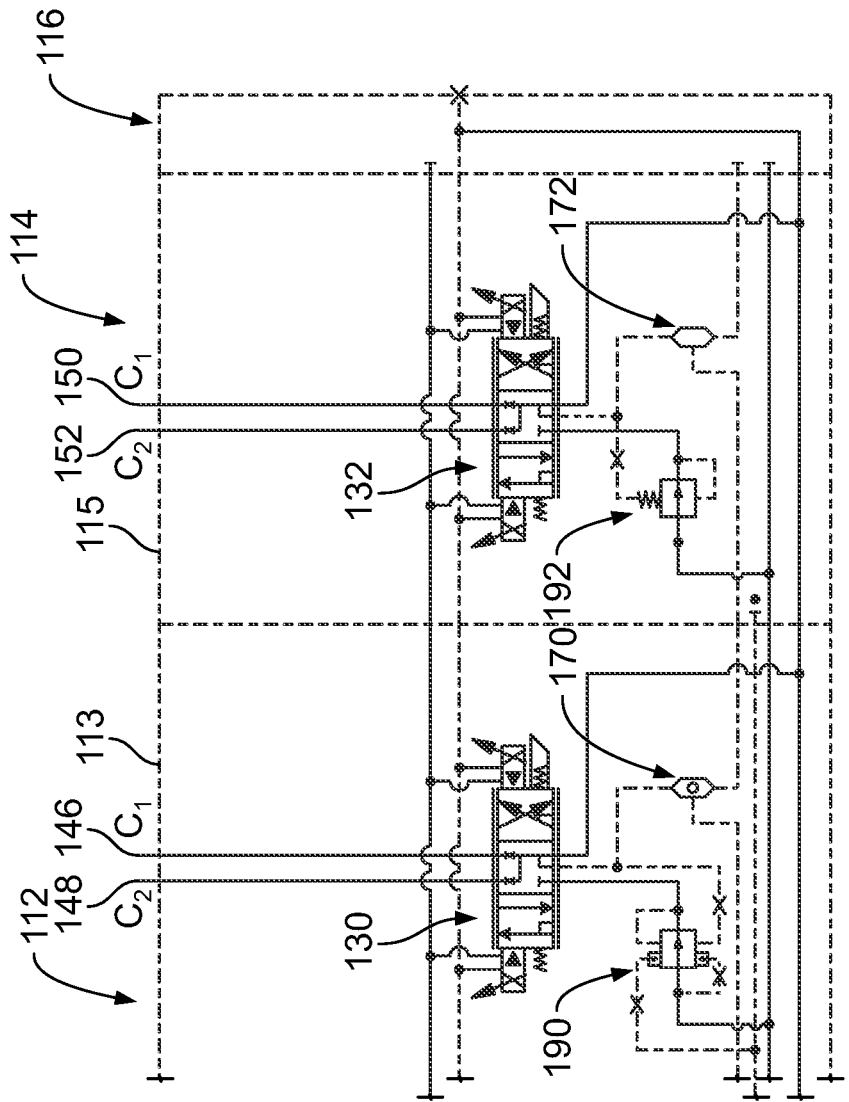

FIG. 1 illustrates a valve assembly 100, and FIG. 2 illustrates a schematic of a hydraulic system 102 that includes the valve assembly 100, in accordance with an example implementation. FIGS. 1 and 2 are described together.

The valve assembly 100 has an inlet section 104, a first worksection 106, a second worksection 108, a third worksection 110, a fourth worksection 112, a fifth worksection 114, and an outlet section 116. The illustrated valve assembly 100 and the hydraulic system 102 are provided for illustration purposes, and in other examples, more or fewer worksections can be used.

The inlet section 104, the worksections, 106, 108, 110, 112, and 114, and the outlet section 116 can be coupled together by fasteners (e.g., bolts screws, clamps, tie rods, etc.) to provide an assembly of valve sections. For example, the worksections 106-114 can be positioned adjacent one another between the inlet section 104 and the outlet section 116 of the valve assembly 100. The outlet section 116 can receive fluid from any of the inlet section 104 and/or the worksections 106-114.

Each of the worksections 106-114 has a housing or worksection body. For instance, the worksection 106 has a worksection body 107, the worksection 108 has a worksection body 109, the worksection 110 has a worksection body 111, the worksection 112 has a worksection body 113, and the worksection 114 has a worksection body 115. The worksection bodies 107, 109, 111, 113, and 115 are shown schematically in FIG. 2 as envelope border.

The hydraulic system 102 shown in FIG. 2 can include a source 117 of fluid. The source 117 of fluid can be a pump (e.g., fixed displacement, variable displacement pump, a load-sense variable displacement pump, etc.), an accumulator, etc. The source 117 can be fluidly coupled to an inlet port 118 disposed in the inlet section 104 of the valve assembly 100 such that output fluid flow from the source 117 is provided to the inlet port 118. The output fluid flow of the source 117 is then provided to the valve sections of the valve assembly 100 via inlet flow passage 119 shown in FIG. 2.

In the examples where the source 117 comprises a pump, such pump can receive fluid from a fluid tank or reservoir 120, and the pump then provides fluid flow to the valve assembly 100. The reservoir 120 can be fluidly coupled to a reservoir port 122 also disposed in the inlet section 104 of the valve assembly 100. During operation of the valve assembly 100, fluid returns to the reservoir 120 from the valve sections of the valve assembly 100 via a return flow passage 123 and through the reservoir port 122.

Referring to FIG. 2, each of the worksections 106-114 can include a main control valve. For example, the worksection 106 includes main control valve 124, the worksection 108 includes main control valve 126, the worksection 110 includes main control valve 128, the worksection 112 includes main control valve 130, and the worksection 114 includes main control valve 132. In examples, the main control valves 124-132 can be configured as three position-four way valves as depicted schematically in FIG. 2.

The worksections 106-114 also include workports that are configured to be fluidly coupled to ports of respective hydraulic actuators (e.g., hydraulic cylinders or hydraulic motors). For example, the worksection 106 includes a first workport 134 (C1 port) and a second workport 136 (C2 port); the worksection 108 includes a first workport 138 (C1 port) and a second workport 140 (C2 port); the worksection 110 includes a first workport 142 (C1 port) and a second workport 144 (C2 port); the worksection 112 includes a first workport 146 (C1 port) and a second workport 148 (C2 port); and the worksection 114 includes a first workport 150 (C1 port) and a second workport 152 (C2 port). Each of the main control valves 124-132 is configured to control supply fluid flow from the inlet flow passage 119 to the respective workports C1 and C2 of the worksection and control return fluid flow from the workports to the return flow passage 123.

Each of the main control valves 124-132 includes a respective main control spool. The main control spool can be configured to be biased to a neutral or centered position by springs. For example, the main control valve 124 can have springs 153, 155 that bias its main control spool (e.g., the main control spool 300 described below) to a neutral position at which the main control spool can block fluid flow from the source to the workports 134, 136. The term "block" is used throughout herein to indicate substantially preventing fluid flow except for minimal or leakage flow of drops per minute, for example.

The main control spool can be actuated in either direction from the neutral position via various types of mechanisms. As an example for illustration, the main control spool of the worksection 106 can be controlled by pilot valves 154, 156 that are solenoid-operated and can be used to actuate or move the spool in a spool bore disposed with the worksection 106. However, other configurations of actuation mechanisms (e.g., manual, pneumatic, etc.) can be used.

In the example implementation shown in FIGS. 1-2, the pilot valves 154, 156 are configured as pressure reducing valves that receive pressurized fluid at a reduced pressure level compared to inlet pressure received from the source 117, then generate a pilot fluid signal that is proportional to a magnitude of an electric command provided thereto. Particularly, the valve assembly 100 can include a pressure reducing valve 158 disposed in the inlet section 104. The pressure reducing valve 158 receives fluid from the source 117 via inlet pilot fluid passage 160 formed in the inlet section 104 and fluid filter 161. The pressure reducing valve 158 reduces the pressure level of the fluid received from the inlet pilot fluid passage 160, then provides a pilot source signal to a pilot fluid passage 162 that traverses the worksections 106-114.

The pilot valves 154, 156 (and the corresponding pilot valves of the other worksections) are fluidly coupled to the pilot fluid passage 162 and thus have access to the pilot source signal. If an electric command is provided to one of the pilot valves 154, 156, the pilot valve opens to provide a pilot signal having a pressure level that is reduced relative to the pressure level of the pilot source signal to one side of the main control spool of the worksection 106. Responsively, the main control spool of the worksection 106 can move axially within the worksection body 107 to provide fluid flow from the inlet flow passage 119 to one of the workports 134, 136.

The valve assembly 100 is configured to be a load-sense (LS) valve. Particularly, the valve assembly 100 has a shuttle valve system that resolves the highest load or the highest load-induced pressure level indicative of the highest load to which the actuators controlled by the valve assembly 100 are subjected. The shuttle valve system then provides the load-sense (LS) signal indicative of the highest load to other components of the valve assembly 100 and the hydraulic system 102.

In the example implementation of FIG. 2, each of the worksections 106-114 can have a respective shuttle valve. For instance, the worksection 106 has a shuttle valve 164, the worksection 108 has a shuttle valve 166, worksection 110 has a shuttle valve 168, worksection 112 has a shuttle valve 170, and the worksection 114 has a shuttle valve 172. In examples, each of the shuttle valves 164-172 can be configured to have two inlet ports and one outlet port. The shuttle valve can receive pressure signals at both inlet ports, and the pressure signal having the higher pressure level is communicated to the outlet port.

For instance, the shuttle valve 172 of the worksection 114 has a first inlet port subjected to a pressure signal indicative of the higher of the pressure levels between the workports 150, 152 and a second inlet port that is blocked. Thus, the shuttle valve 172 provides a signal having the higher of the pressure levels between the workports 150, 152 to the outlet port of the shuttle valve 172. The outlet port of the shuttle valve 172 is in turn fluidly coupled to an inlet port of the shuttle valve 170 of the worksection 112. The other inlet port of the shuttle valve 170 is subjected to a pressure signal indicative of the higher of the pressure levels between the workports 146, 148. Thus, a signal having the higher pressure level between the workports 146, 148, 150, 152 is communicated to the outlet port of the shuttle valve 170.

Similarly, the outlet port of the shuttle valve 170 is fluidly coupled to an inlet port of the shuttle valve 168 of the worksection 110. The other inlet port of the shuttle valve 168 is subjected to a pressure signal indicative of the higher of the pressure levels between the workports 142, 144. Thus, a signal having the higher pressure level between the workports 142, 144, 146, 148, 150, 152 is communicated to the outlet port of the shuttle valve 168.

The outlet port of the shuttle valve 168 is in turn fluidly coupled to an inlet port of the shuttle valve 166 of the worksection 108. The other inlet port of the shuttle valve 166 is subjected to a pressure signal indicative of the higher of the pressure levels between the workports 138, 140. Thus, a signal having the higher pressure level between the workports 138, 140, 142, 144, 146, 148, 150, 152 is communicated to the outlet port of the shuttle valve 166.

Similarly, the outlet port of the shuttle valve 166 is fluidly coupled to an inlet port of the shuttle valve 164 of the worksection 106. The other inlet port of the shuttle valve 164 is subjected to a pressure signal indicative of the higher of the pressure levels between the workports 134, 136. Thus, a signal having the higher pressure level between the workports 134, 136, 138, 140, 142, 144, 146, 148, 150, 152 is communicated to the outlet port of the shuttle valve 164. The outlet port of the shuttle valve 164 is fluidly coupled to a load-sense (LS) passage 174. With this configuration, the LS passage 174 receives and transmits a pressure signal that represents a global LS pressure signal indicative of the highest pressure level among all workports.

The valve assembly 100, and particularly the inlet section 104, includes a restrictor check device 176 having a check valve and an orifice. The check valve allows fluid flow from the LS passage 174 to a load-sense relief valve 178 (and e.g., a bypass compensator valve 182 described below) while preventing fluid flow in the other direction. The orifice of the restrictor check device 176 operates as a dampening orifice to preclude or reduce instabilities that might result from pressure fluctuations in the LS passage 174. The LS relief valve 178 prevents pressure level of the LS pressure signal in the LS passage 174 to exceed a threshold pressure level. If such threshold pressure level is exceeded, the LS relief valve 178 opens, thereby providing a flow path to the return flow passage 123 and the reservoir 120 to relieve the pressure signal in the LS passage 174.

The valve assembly 100 further includes a flow-limiting orifice 179. The flow-limiting orifice 179 similarly operates as a dampening orifice but also restricts the amount of fluid flowing to the LS relief valve 178 to preclude saturating the LS relief valve 178. Particularly, if pressure level in the LS passage 174 exceeds the pressure setting or threshold pressure level of the LS relief valve 178 causing the LS relief valve 178 to open to the reservoir 120, a pressure drop can be generated across the flow-limiting orifice 179. The size of the flow-limiting orifice 179 then controls the amount of fluid flow thereacross (e.g., to about 0.25 gallons per minute (GPM)) so as to enable the LS relief valve 178 to relieve the LS pressure signal and maintain the pressure level in the LS passage 174 at the threshold pressure level rather than being saturated.

In addition to the LS pressure signal being provided to the LS relief valve 178, it is also provided in parallel to a valve load-sense passage 180. The valve LS passage 180 is a "global" LS passage that traverses the worksection 106-114. With this configuration, all the worksections 106-114 have access to the global LS pressure signal in the valve LS passage 180, which indicates the highest pressure level or load amongst all workports 134-152.

In examples, the valve assembly 100 can include a bypass compensator valve 182. The bypass compensator valve 182 is configured to ensure that there is a margin pressure or differential pressure, e.g., a delta pressure of about 300 pounds per square inch (psi), between pressure of fluid provided by the source 117 and the pressure level of the LS pressure signal in the LS passage 174.

The bypass compensator valve 182 can have a movable element (e.g., a piston or spool) that is subjected to the LS pressure signal and pressure level in the inlet flow passage 119 (via the inlet pilot fluid passage 160) and a biasing force of a spring, for example. The bypass compensator valve 182 also has an outlet port that is fluidly coupled to the return flow passage 123. The movable element moves to an equilibrium position that is determined based on the pressure levels of the LS pressure signal and the inlet flow passage 119 and the biasing force so as to maintain a margin pressure setting or differential between the pressure level in the inlet flow passage 119 and the LS pressure signal. The bypass compensator valve 182 exhausts enough fluid flow to the return flow passage 123 to create the margin pressure setting. As an example for illustration, if pressure level of the LS pressure signal in the LS passage 174 is 2000 psi, then the movable element (e.g., a spool or piston) within the bypass compensator valve 182 moves so as to cause the pressure level in the inlet flow passage 119 to be about 2300 psi.

In a flow over-demand situation where the amount of fluid flow requested by all the worksections 106-114 exceeds a maximum flow capacity of the source 117, the bypass compensator valve 182 might shut or close off to allow all the fluid provided from the source 117 to bypass the bypass compensator valve 182 and flow to the worksections 106-114. In this case, it may take a smaller pressure differential (e.g., 200 psi) rather than the pressure margin setting (e.g., 300 psi) to push the maximum fluid flow capacity from the source 117 to the inlet flow passage 119.

In another example implementation, the source 117 can be configured as a load-sensing variable displacement pump that receives the LS pressure signal in the LS passage 174. Such pump can responsively provide enough fluid flow to maintain the margin pressure setting between its output flow provided to the inlet flow passage 119 and the LS pressure signal. In this example, the bypass compensator valve 182 might not be used in the hydraulic system 102.

Further, the valve assembly 100 is configured such that the worksections 106-114 can have respective pressure compensator valves. For example, the worksection 106 has pressure compensator valve 184, the worksection 108 has pressure compensator valve 186, the worksection 110 has pressure compensator valve 188, the worksection 112 has pressure compensator valve 190, and the worksection 114 has pressure compensator valve 192.

The pressure compensator valves 184-192 are disposed downstream from the inlet flow passage 119 and upstream from the main control valves 124-132, respectively. With this configuration, the pressure compensator valves 184-192 can be referred to as a pre-pressure compensator valve. The pressure compensator valves 184-192 are configured to control supply pressure and regulate supply flow from the inlet flow passage 119 to the main control valves 124-132 so as to maintain a predetermined pressure drop across a variable metering orifice formed when a respective main control spool of a respective worksection is actuated. Maintaining a predetermined pressure drop across the variable metering orifice can allow for proportionality between the amount of flow provided to the actuator and the command signal to the pilot valve that actuates the spool, regardless of the load on the actuator and regardless of pressure level of fluid in the inlet flow passage 119.

The pressure compensator valves 184-192 can be configured similarly or differently based on desired characteristics of a respective worksection and associated actuator. For example, in the implementation shown in FIG. 2, the pressure compensator valves 184-190 are configured to be flow sharing compensators as described in more detail below. In particular, each of the pressure compensator valves 184-190 is subjected to four pressure signals and responds to a force balance based on the four pressure signals to allow for flow sharing when multiple actuators are actuated at the same time. On the other hand, the pressure compensator valve 192 is subjected to two pressure signals, rather than four and may thus operate differently.

Further, at least one of the pressure compensator valves 184-190 can have a compensator spring configured to apply a biasing force on a compensator spool of the pressure compensator valve in addition to the four fluid forces applied respectively by the four pressure signals. For example, the pressure compensator valve 184 has a compensator spring 193. As described below, the compensator spring 193 enables the worksection 106 associated with the pressure compensator valve 184 to have: (i) a higher flow capacity, (ii) enhanced compensator efficiency, and (iii) priority flow compared to other worksections or equalize flow between the worksections regardless of the respective actuator loads.

For example, referring to the pressure compensator valve 184 of the worksection 106, the pressure compensator valve 184 has access, or is subjected to, to four pressure signals: (i) a first signal 194 representing pressure level (P1) of regulated fluid flow provided from the pressure compensator valve 184 to the main control valve 124 of the worksection 106, (ii) a second signal 195 representing local LS pressure signal having the higher pressure level (P2) between the workports 134, 136, (iii) a third signal 196 representing the highest LS pressure level (P3) transmitted via the valve LS passage 180, and (iv) a fourth signal 197 representing inlet pressure level (P4) of fluid supplied from the source 117 through the inlet flow passage 119.

Conventional pre-pressure compensator valves might be configured to be subjected to a local LS signal (e.g., the signal 195) of the associated worksection without being subjected to the signal 196 representing the highest LS pressure level (P3) among all worksections. Thus, conventional pre-pressure compensator valves might not be "aware" of a loading condition in other worksections and associated actuators. Thus, in conventional valves, assuming two worksections are actuated causing a flow over-demand on the source 117, if a first worksection is subjected to a lower load compared to a second worksection, more flow from the source 117 would flow through the first worksection compared to the second worksection.

In contrast, the pressure compensator valve 184 is subjected to the signal 196 (P3) as well as the signal 195 (P2). Thus, if another worksection (e.g., the worksection 108) has a higher LS pressure signal, such higher LS pressure signal is communicated to the pressure compensator valve 184 as the signal 196, and it causes the pressure compensator valve 184 to restrict fluid flow through the pressure compensator valve 184. This way, in an over-demand case where more than the flow capacity of the source 117 is requested, the amount of fluid flow provided to the actuators of the worksections 106, 108 are reduced proportionally as opposed to providing more fluid flow to the worksection 106 with the lower load. As such, the configuration of the pressure compensator valves 184-190 allow for "flow-sharing" of the fluid provided by the source 117. Further, in the over-demand case and for a given highest LS pressure level (P3) (the signal 196), the inlet pressure level (P4) decreases because the total flow resistance of all the worksections increases. Full pump flow output cannot create the margin pressure (P4-P3). So, the pressure compensator valves move in a closing direction, thus reducing each workport output flow until each compensator reaches force equilibrium.

Figure 3:
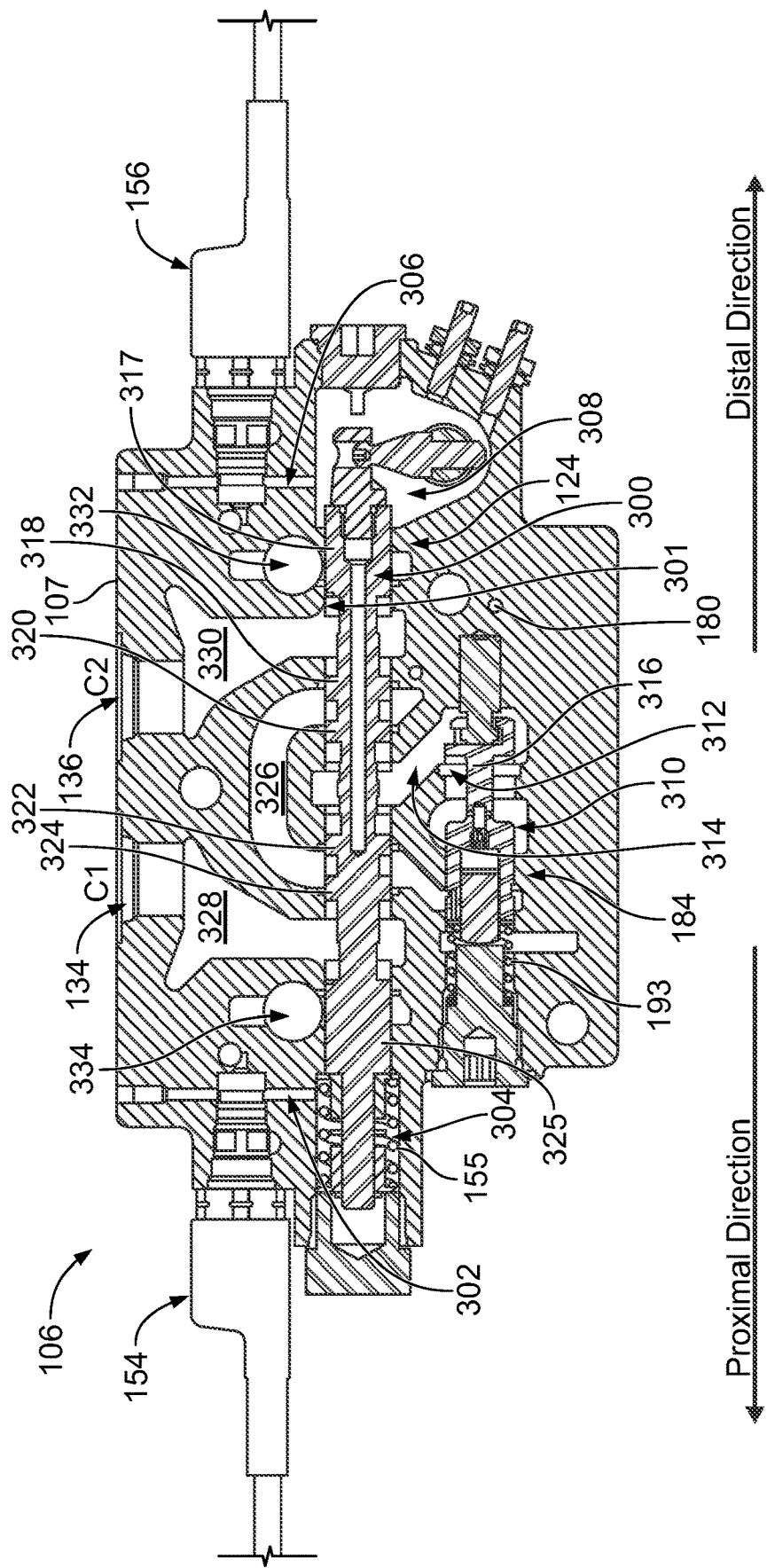
FIG. 3 illustrates a cross-sectional view of a worksection that includes a pressure compensator valve, in accordance with another example implementation.

FIG. 3 illustrates a cross-sectional view of the worksection 106 that includes the pressure compensator valve 184, in accordance with an example implementation. The main control valve 124 is a directional control valve having a main control spool 300 slidably accommodated (i.e., axially movable) in a longitudinal bore 301 in the worksection body 107. FIG. 3 illustrates the main control spool 300 in a neutral position.

If the pilot valve 154 is actuated (e.g., via an electric command from an electronic controller), a pilot pressure signal is provided via pilot passage 302 to a first cavity 304 at a first end of the main control spool 300. As a result, the main control spool 300 can shift in a first axial direction (e.g., distal direction to the right in FIG. 3). If the pilot valve 156 is actuated (e.g., via an electric command from an electronic controller), a pilot pressure signal is provided via pilot passage 306 to a second cavity 308 at a second end of the main control spool 300. As a result, the main control spool 300 can shift in a second axial direction (e.g., proximal direction to the left in FIG. 3).

Inlet fluid flow from the source 117 of fluid is provided through the inlet flow passage 119 to a compensator inlet cavity 310 formed in the worksection body 107. The fluid is then regulated by the pressure compensator valve 184 by flowing through a flow area 312 then to a regulated flow passage 314. The size of the flow area 312, and the pressure drop thereacross, changes based on axial position of a compensator spool 316 as described in detail below.

The main control spool 300 varies in diameter along its length to form lands of variable diameters capable of selectively interconnecting the various passages intercepting the longitudinal bore 301 to control flow of fluid to and from the workports 134, 136. The lands of the main control spool 300 cooperate with internal surfaces of the worksection body 107 to define variable metering orifices that allows fluid flow therethrough. For example, the main control spool 300 has land 317, land 318, land 320, land 322, land 324, and land 325 configured to cooperate with the internal surfaces of the worksection body 107 to form the variable metering orifices and control the fluid flow rate and fluid direction through the worksection 106. The variable metering orifices are spool-to-bore cylindrical area openings between the main control spool 300 and the internal surfaces of the worksection body 107 that form when the main control spool 300 shifts axially therein.

For instance, if the pilot valve 154 is actuated and the main control spool 300 shifts axially in the distal direction, the land 320 moves in the distal direction. As the land 320 moves distally to the extent that it moves past an edge of the internal surface of the worksection body 107 interfacing therewith, a metering orifice is formed that allows fluid flow from the regulated flow passage 314 to a metered flow passage 326 configured as a looped passage as depicted in FIG. 3.

At the same time that the land 320 moves past the edge of the internal surface of the worksection body 107, the land 324 can also move past a respective edge in the internal surface of the worksection body 107 and another metering orifice is formed that allows fluid flow from the metered flow passage 326 to a first workport passage 328. The workport passage 328 is fluidly coupled to the workport 134 and thus fluid flows from the workport passage 328 to the workport 134, and then to the actuator controlled by the worksection 106. Fluid returning from the actuator through the workport 136 flows through a second workport passage 330, then through another metering orifice formed between the land 317 and the internal surface of the worksection body 107 to a reservoir cavity 332, which is fluidly coupled to the return flow passage 123 and the reservoir 120 depicted in FIG. 2.

Conversely, if the pilot valve 156 is actuated and the main control spool 300 shifts axially in the proximal direction, the land 322 moves in the proximal direction. As the land 322 moves proximally to the extent that it moves past an edge of the internal surface of the worksection section 107, a metering orifice is formed that allows fluid flow from the regulated flow passage 314 to the metered flow passage 326.

At the same time that the land 322 moves past the edge of the internal surface of the worksection body 107, the land 318 can also move past a respective edge in the internal surface of the worksection section 107 and another metering orifice is formed that allows fluid flow from the metered flow passage 326 to the workport passage 330. The workport passage 330 is fluidly coupled to the workport 136 and thus fluid flows from the workport passage 330 to the workport 136, and then to the actuator controlled by the worksection 106. Fluid returning from the actuator through the workport 134 flows through the workport passage 328, then through another metering orifice formed between the land 325 and the internal surface of the worksection body 107 to another reservoir cavity 334, which is fluidly coupled to the return flow passage 123 and the reservoir 120 depicted in FIG. 2.

As mentioned above, the pressure compensator valve 184 is configured to be subjected to fluid forces resulting from four pressure signals and the biasing force of the compensator spring 193. The force balance between these forces determines the axial position of the compensator spool 316 within the worksection body 107 and thus determines the size of the flow area 312. The pressure compensator valve 184 is configured such that the size of the flow area 312 varies based on variations in the forces to change the drop in pressure level across the flow area 312. This way, the pressure drop in the pressure level of fluid as it flows from the regulated flow passage 314 to the metered flow passage 326 remains substantially constant.

Figure 4:
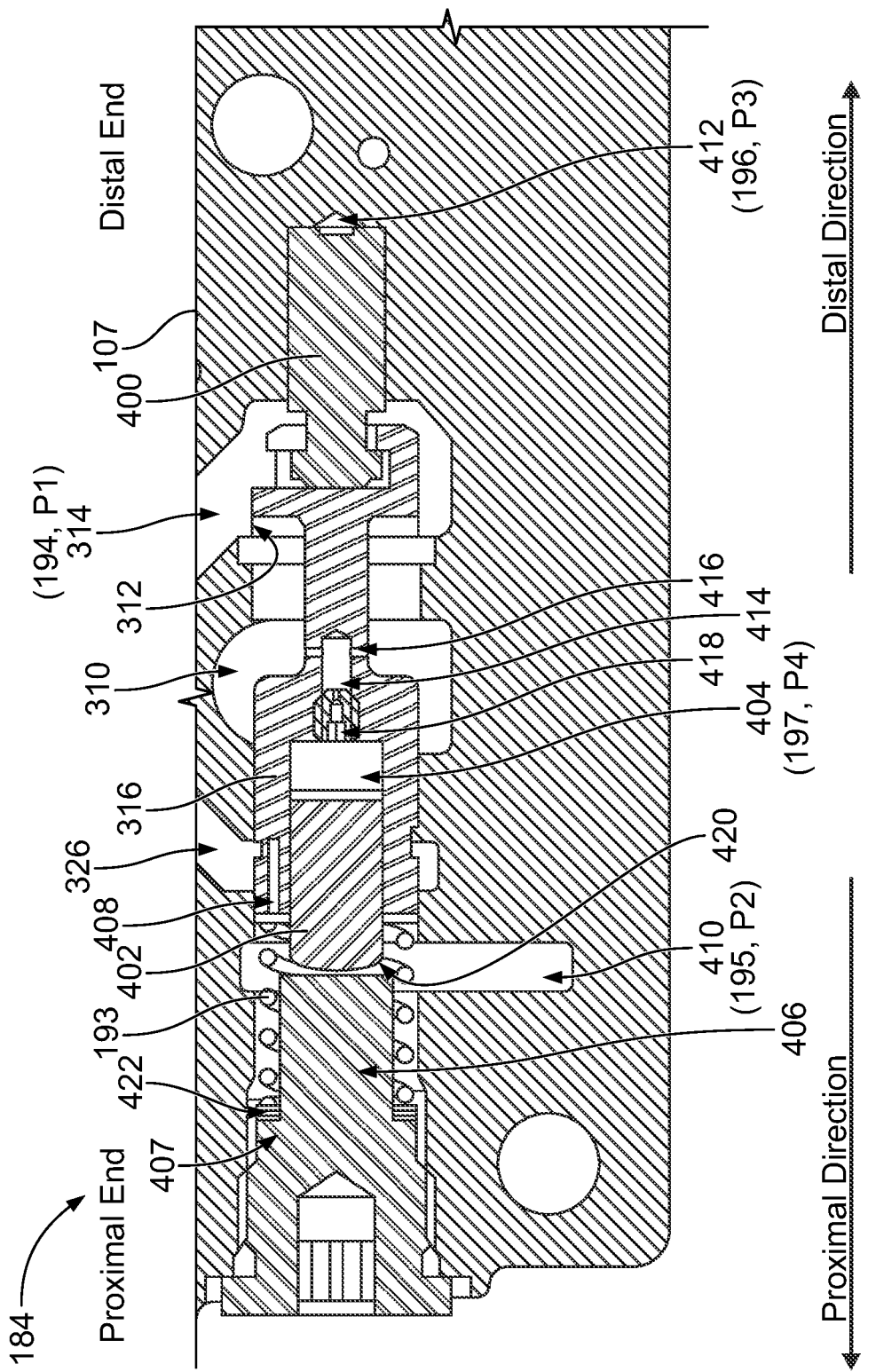
FIG. 4 illustrates a partial cross-sectional view of the worksection of FIG. 3 depicting the pressure compensator valve, in accordance with an example implementation.

FIG. 4 illustrates a partial cross-sectional view of the worksection 106 depicting the pressure compensator valve 184, in accordance with an example implementation. FIG. 4 represents a zoom-in view of the cross-sectional view in FIG. 3 to illustrate construction details of the pressure compensator valve 184.

The pressure compensator valve 184 comprises the compensator spool 316, a first piston 400 disposed at a distal end of the compensator spool 316, and a second piston 402 disposed in a cavity 404 formed at a proximal end of the compensator spool 316. The first piston 400 can be referred to as a valve load-sense signal piston 400 as it is subjected to the signal 196 (valve LS pressure signal). The second piston 402 can be referred to as a pump signal piston or fluid source signal piston as it is subjected to the signal 197 from the source 117. The compensator spool 316 is slidable about an exterior surface of the second piston 402.

The first piston 400 is coupled to, and axially movable with, the compensator spool 316. For example, the first piston 400 can have an exterior annular groove formed on an exterior peripheral surface thereof that is configured to engage with a slot or an interior annular groove formed in an interior surface of the compensator spool 316. This configuration represents a T-slot engagement configuration; however, other arrangements can be implemented to mechanically couple or link the first piston 400 to the compensator spool 316.

A proximal end of the second piston 402 is secured against a compensator plug 406 that is fixedly disposed in the worksection 106 adjacent the proximal end of the compensator spring 193. The compensator spring 193 is disposed about the exterior surface of the compensator plug 406. A proximal end of the compensator spring 193 is secured against a shoulder 407 formed in the exterior surface of the compensator plug 406 and a distal end of the compensator spring 193 rests against a proximal end of the compensator spool 316. With this configuration, the compensators spring 193 applies a biasing force Fspr on the compensator spool 316 in the distal direction.

Referring to Figured 2, 3, and 4 together, regulated fluid flow in the regulated flow passage 314 provides the first signal 194 representing pressure level (P1) of regulated fluid flow provided from the pressure compensator valve 184 to the main control valve 124 of the worksection 106. The signal 194 applies a first fluid force F1 on the compensator spool 316 in the proximal direction.

When the main control spool 300 shifts, the metered flow passage 326 is fluidly coupled to the workport 134 (via the workport passage 328) or the workport 136 (via the workport passage 330) based on the direction in which the main control spool 300 shifts. Thus, fluid in the metered flow passage 326 provides the second signal 195 representing local LS pressure signal having the pressure level (P2) of the workport 134 or the workport 136. Fluid in the metered flow passage 326 is communicated through a channel 408 formed in the compensator spool 316 to a load-sense cavity 410, and therefore applies a second fluid force F2 on an annular area of the proximal end of the compensator spool 316 in the distal direction.

The third signal 196 representing the highest LS pressure level (P3) transmitted via the valve LS passage 180 is communicated in the valve assembly 100 to valve load-sense cavity 412 formed in the worksection 106 at a distal end of the first piston 400. Fluid in the valve LS cavity 412 applies a third fluid force F3 on the first piston 400, and thus on the compensator spool 316 coupled thereto, in the proximal direction.

The fourth signal 197 representing inlet pressure level of fluid supplied from the source 117 through the inlet flow passage 119 is communicated to the compensator inlet cavity 310. Fluid is then communicated from the compensator inlet cavity 310 to the cavity 404 through cross-hole 416, channel 414, and orifice 418 formed in the compensator spool 316. Because the second piston 402 is secured against the compensator plug 406, fluid in the cavity 404 applies a fourth fluid force F4 on the compensator spool 316 in the distal direction.

Notably, the second piston 402 has a spherical proximal surface 420 interfacing with the compensator plug 406. Having such a spherical surface at the proximal end of the of the second piston 402, as opposed to a flat surface, can reduce the likelihood of binding between the second piston 402 and the compensator plug 406 under pressure. Further, the spherical proximal surface 420 can also compensate for manufacturing tolerance issues such as out-of-flatness or eccentricities in the mating parts. Also, under fluid force from pressurized fluid, the second piston 402 can rotate along its longitudinal axis. The curvedness of the spherical proximal surface 420 can reduce flow hysteresis and non-repeatability of performance of the pressure compensator valve 184 that might result from such rotation.

A force balance between the biasing force Fspr of the compensator spring 193 and the four fluid forces F1-F4 determines an axial position of the compensator spool 316 and the size of the flow area 312. A force equilibrium equation of forces acting on the compensator spool 316 can be expressed as follows:

$$F_1 + F_3 = F_2 + F_4 + F_{spr} \qquad (1)$$

Thus, the difference between the forces F1 and F2, which represents the difference in pressure level (P1-P2) between pressure level in the regulated flow passage 314 and pressure level in the metered flow passage 326, can be expressed as:

$$F_1 - F_2 = F_4 - F_3 + F_{spr} \qquad (2)$$

As a particular example for illustration, if the outer diameter of the pistons 400, 402 is 0.375 inches and the outer diameter of the compensator spool 316 is 0.625 inches, then the pressure difference (P1-P2) can be determined as:

$$P_1 - P_2 = (F_{spr} + 0.56(P_4 - P_3)) \qquad (3)$$

Without the compensator spring 193, the pressure difference (P1-P2) would be $0.56(P_4 - P_3)$.

Notably, because the difference in pressure level (P1-P2) is based on pressure the difference in pressure level (P4-P3), the axial position of the compensator spool 316 responds to, not only local LS pressure signal (i.e., the signal 195, P2), but also the "global" LS signal (i.e., i.e., the signal 196, P3). With this configuration, if the actuator controlled by the worksection 106 is subjected to a lower load compared to the actuator associated with another actuated worksection, i.e., if P2<P3, the higher global LS signal (P3) can cause the first piston 400 to push the compensator spool 316 in the proximal direction. As a result, the flow area 312 is further restricted to reduce flow rate therethrough. As such, priority is not given to the worksection having the lowest LS pressure signal, but rather fluid flow rates are reduced proportionally for all actuated worksections.

Also, the bypass compensator valve 182 described above operates to maintain the pressure differential (P4-P3) substantially constant and equal to a particular pressure margin setting. Alternatively, if a load-sensing pump is used, the pump can operate to maintain the pressure margin setting, i.e., maintain the pressure differential (P4-P3) substantially constant. As a result of equation (3), the pressure differential (P1-P2), which the pressure difference between fluid in the regulated flow passage 314 upstream of the main control spool 300 and fluid in the metered flow passage 326 downstream of the main control spool 300, can be maintained substantially constant.

Maintaining the pressure drop from the regulated flow passage 314 to the metered flow passage 326 across the variable metering orifice (formed when the main control spool 300 shifts) substantially constant facilitates proportionality between the command to the pilot valves 154, 156 and the fluid flow rate to the workports 134, 136. Particularly, fluid flow through the variable metering orifice can be determined as $Q=K\sqrt{(P_1-P_2)}$. K is a variable that is proportional to the size of the variable metering orifice formed when the main control spool 300 shifts, and thus K is determined based on the magnitude of the command signal to the pilot valve 154, 156. Thus, maintaining (P1-P2) substantially constant causes the command signal to the pilot valves 154, 156 to be proportional to the flow rate Q. Further, as can be inferred from equation (3), the presence of the compensator spring 193 can increase the pressure difference (P1-P2), and can thus increase the fluid flow rate from the regulated flow passage 314 to the metered flow passage 326 for the worksection 106.

The presence of the compensator spring 193 can provide several enhancements for the worksection 106. As a first example enhancement, the output fluid flow from the worksection 106 to the workport 134 or the workport 136 and to the actuator fluidly coupled thereto can be varied by adjusting the biasing force of the compensator spring 193.

Adjusting the biasing force of the compensator spring 193 can be implemented in various ways. As a first implementation, as shown in FIG. 4, one or more shims 422 can be placed at a proximal end of the compensator spring 193, and particularly between the proximal end of the compensator spring 193 and the shoulder 407. Adding more shims reduces the initial length of the compensator spring 193, thereby increasing the biasing force of the compensator spring 193 applied to the compensator spool 316. Based on equation (3) above, increasing the biasing force of the compensator spring 193 can increase the pressure differential (P1-P2), thereby increasing the fluid flow rate through the worksection 106.

Conversely, reducing the number of the shims 422 (or removing the shims 422) relaxes the compensator spring 193 and increases its initial length, thereby decreasing the biasing force of the compensator spring 193 applied to the compensator spool 316. Based on equation (3) above, decreasing the biasing force of the compensator spring 193 can decrease the pressure differential (P1-P2), thereby decreasing the fluid flow rate through the worksection 106.

Figure 5:
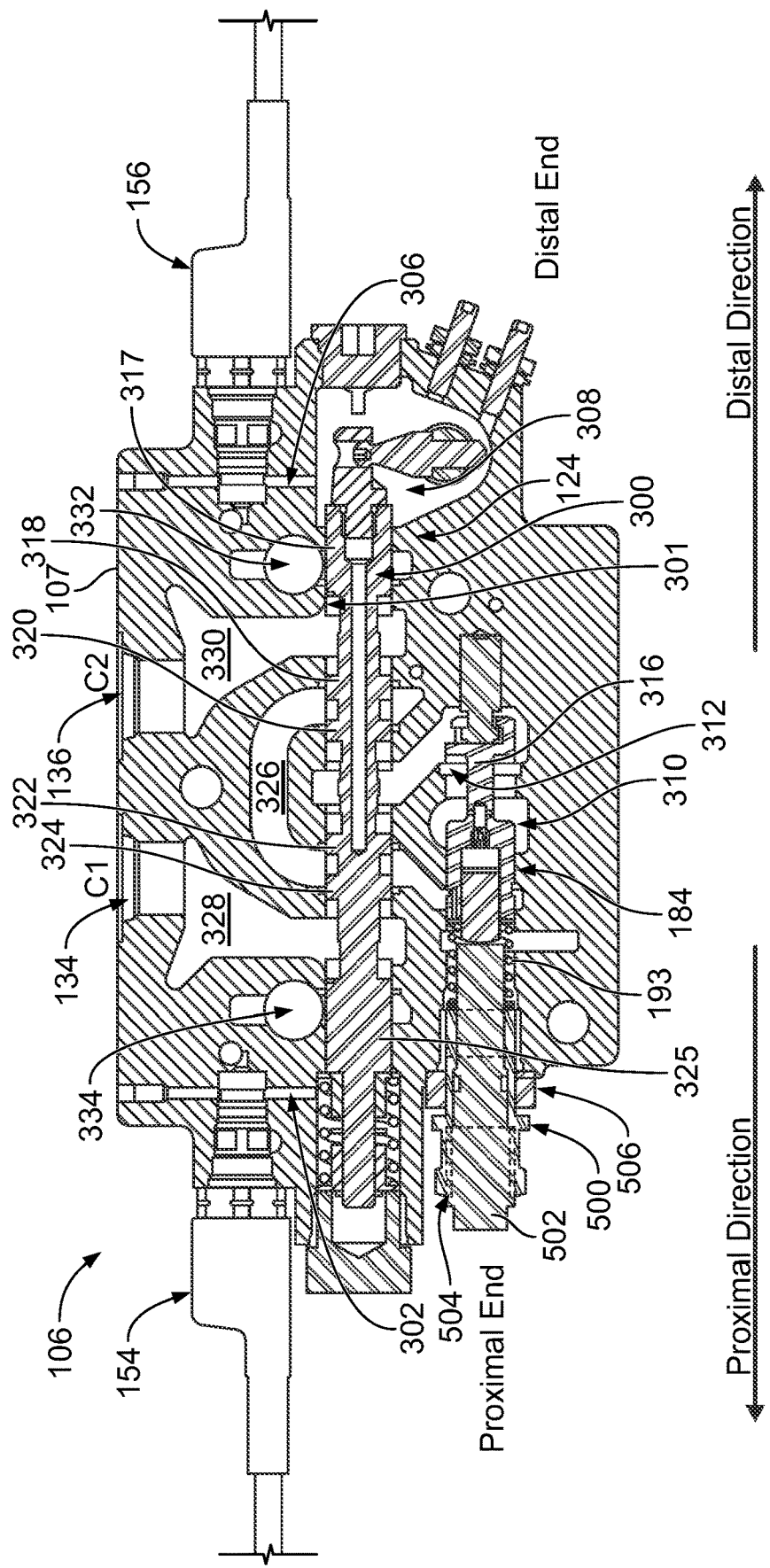
FIG. 5 illustrates a cross-sectional view of a worksection with a pressure compensator valve having an adjustment piston, in accordance with an example implementation.

In a second implementation, adjusting the initial length and biasing force of the compensator spring 193 can be accomplished by using an adjustment piston. FIG. 5 illustrates a cross-sectional view of the worksection 106 with the pressure compensator valve 184 having an adjustment piston 500, in accordance with an example implementation.

A distal end of the adjustment piston 500 interfaces with or contacts the proximal end of the compensator spring 193 such that longitudinal or axial motion of the adjustment piston 500 changes the length of the compensator spring 193. The adjustment piston 500 can be threadedly coupled to a compensator plug 502 at threaded region 504. The adjustment piston 500 can also be threadedly coupled to a nut 506 and can further be threadedly coupled to threads in the worksection body 107.

If the adjustment piston 500 is rotated in a first rotational direction (e.g., clockwise), the adjustment piston 500 moves axially in the distal direction (e.g., to the right in FIG. 5) due to its threaded engagement with the compensator plug 502 and the worksection body 107. Movement of the adjustment piston 500 in the distal direction compresses the compensator spring 193 and increases its biasing force. Conversely, if the adjustment piston 500 is rotated in a second rotational direction (e.g., counter-clockwise), the adjustment piston 500 moves axially in the proximal direction (e.g., to the left in FIG. 5). Movement of the adjustment piston 500 in the proximal direction relaxes the compensator spring 193 and decreases its biasing force.

In an example experiment, the main control spool 300 of the worksection 106 is shifted and the respective main control spool of the worksection 108 is also shifted to allow a fluid flow rate of about 1.4 GPM through the worksection 108. Without shims being used, the fluid flow rate through the worksection 106 can be about 23.7 GPM. When the shims 422 are added with a total thickness of about 0.295 inches and a compensator spring with a higher spring rate is used to increase the spring force, the flow rate through the worksection 106 increased to 28.8 GPM. When the worksection 106 is actuated without actuating the worksection 108, a flow rate increase from 22.1 GPM (without shims) to 27 GPM is observed when the shims 422 having a thickness of 0.295 inches are added and the compensator spring with the higher spring rate is used.

As a second example enhancement, the compensator spring 193 can enhance compensation efficiency of the pressure compensator valve 184. Efficiency of a pressure compensator valve is related to its ability to maintain pressure compensation (i.e., maintain the pressure differential P1-P2 substantially constant) regardless of the changes in the different pressure levels P1, P2, P3, and P4, changes in flow rates across the flow area 312, and the resulting changes in flow forces acting on the compensator spool 316.

Bernoulli flow forces can result from accelerating fluid mass through the flow area 312 between the compensator spool 316 and the internal surfaces of the worksection body 107. The flow forces can have an axial component that acts on the compensator spool 316 in a closing (proximal) direction (e.g., to the left in FIGS. 3-5) opposing the opening force applied to the compensator spool 316 (e.g., the opening force resulting from the signals 195 (P2) and the signal 197 (P4) that act to move the compensator spool 316 in the distal direction to increase the size of the flow area 312). In some cases, the flow forces are sufficiently high that the opening forces might not be sufficient to maintain pressure compensation (i.e., maintain the pressure differential P1-P2 substantially constant) as the pressure level P4 increases or the flow rate across the flow area 312 increases.

Presence of the compensator spring 193 can enhance compensation efficiency of the pressure compensator valve 184, particularly in high flow rate ranges through the flow area 312. In particular, the biasing force of the compensator spring 193 acts on the compensator spool 316 in the distal direction to counter the flow force acting on the compensator spool 316 in the proximal direction. This way, the size of the flow area 312 may remain sufficient to maintain the flow rate thereacross independent of inlet or workport load pressure changes (i.e., changes in any of P1, P2, P3, P4).

Figure 6:
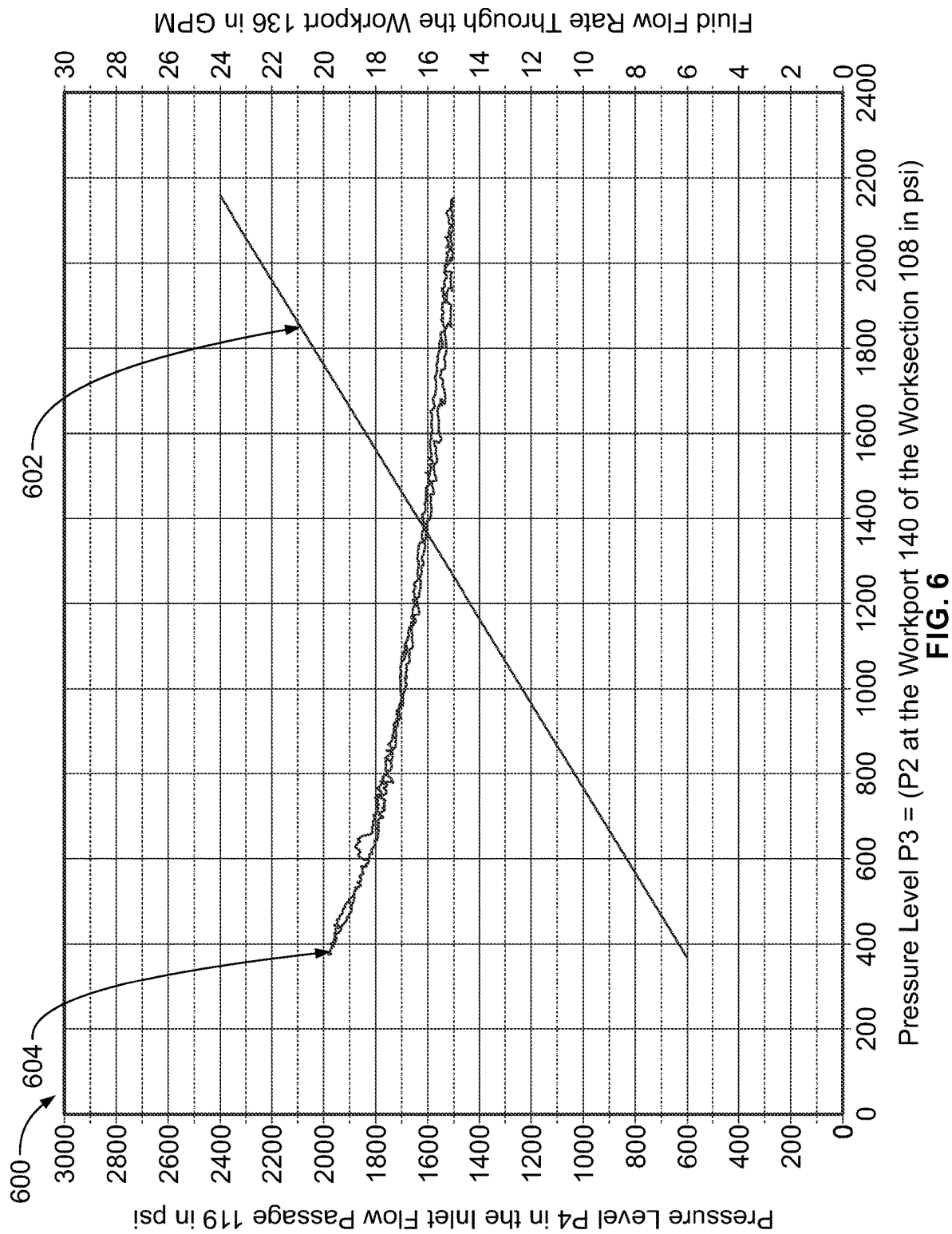
FIG. 6 illustrates a graph associated with experimental results showing compensation efficiency when a compensator spring is not used, in accordance with an example implementation.

FIG. 6 illustrates a graph 600 associated with experimental results showing compensation efficiency when the compensator spring 193 is not used, in accordance with an example implementation. The left y-axis in the graph 600 represents pressure level P4 (the signal 197) in the inlet flow passage 119, whereas the right y-axis in the graph 600 represents the fluid flow rate Q provided to the workport 136 of the worksection 106 when the main control spool 300 is shifted in the proximal direction (e.g., to the left in FIG. 3). The flow rate Q provided to the workport 136 is the same as the flow rate provided from the regulated flow passage 314 to the metered flow passage 326.

Line 602 represents variation in the pressure level P4 as the highest LS pressure (the pressure level P3) changes. As the pressure level P4 increases, the pressure compensator valve 184 operates to maintain the pressure level P1 to maintain a particular pressure differential (P1-P2) (e.g., 140 psi). Line 604 illustrates variation in the flow rate Q through the workport 136 as the pressure level P4 changes.

The flow rate Q should remain substantially constant for a given axial main control spool position as the pressure level P4 changes because the pressure differential (P1-P2) remains constant. However, the line 604 illustrates that the flow rate Q decreases from 20 GPM to 15 GPM (a 25% reduction in flow rate) as P4 increases from about 600 psi to about 2400 psi. Such reduction likely results from the flow forces that increase and tend of reduce the size of the flow area 312 as the pressure level P4 increases.

Figure 7:
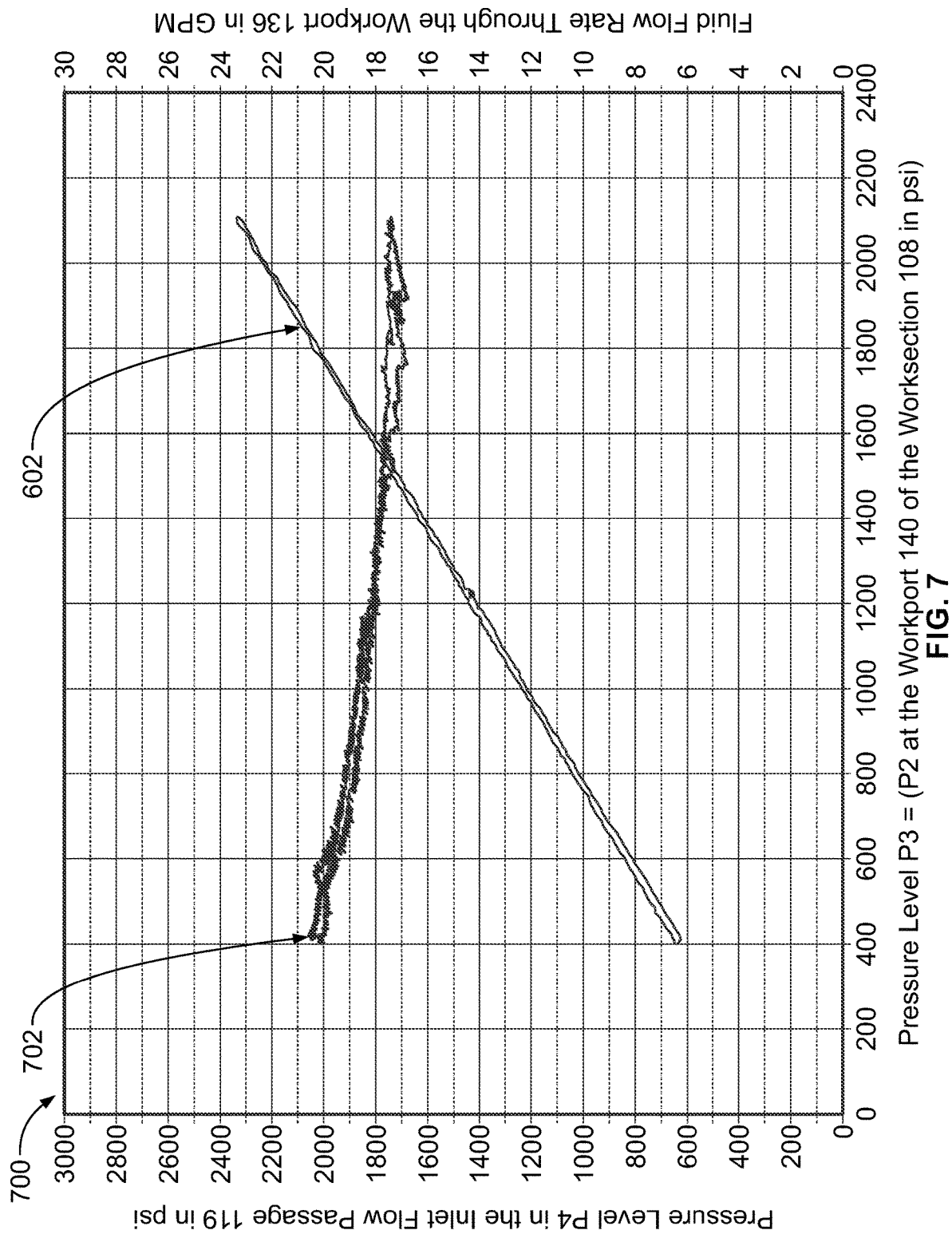
FIG. 7 illustrates a graph associated with experimental results showing enhancement in compensation efficiency when a compensator spring is used, in accordance with an example implementation.

FIG. 7 illustrates a graph 700 associated with experimental results showing enhancement in compensation efficiency when the compensator spring 193 is used, in accordance with an example implementation. In this experiment, the compensator spring 193 used has a spring rate of about 15 pound per inch resulting in a spring force of about 14 pound-force. Line 702 illustrates variation in the flow rate Q through the workport 136 as the pressure level P4 changes when the compensation spring 193 is used.

As shown in FIG. 7, when the compensation spring 193 is used, the line 702 shows the flow rate Q decreases from 20 GPM to about 17.5 GPM (a 2.5 GPM reduction in flow rate as opposed to 5 GPM when the compensator spring 193 is not used). As such, the compensator spring 193 enhances the compensation efficiency of the pressure compensator valve 184 by about 50%.

A third example enhancement involves using the compensator spring 193 to adjust flow split between the worksections 106-114 when the total amount of flow rate requested by all worksections exceeds the flow capacity of the source 117 (e.g., an over-demand case where total flow rate requested exceeds a flow capacity of a pump). The compensator spring 193 can be used to provide a flow priority to a particular worksection (e.g., the worksection 106) or can be used to equalize flow rates among the worksections.

Figure 8:
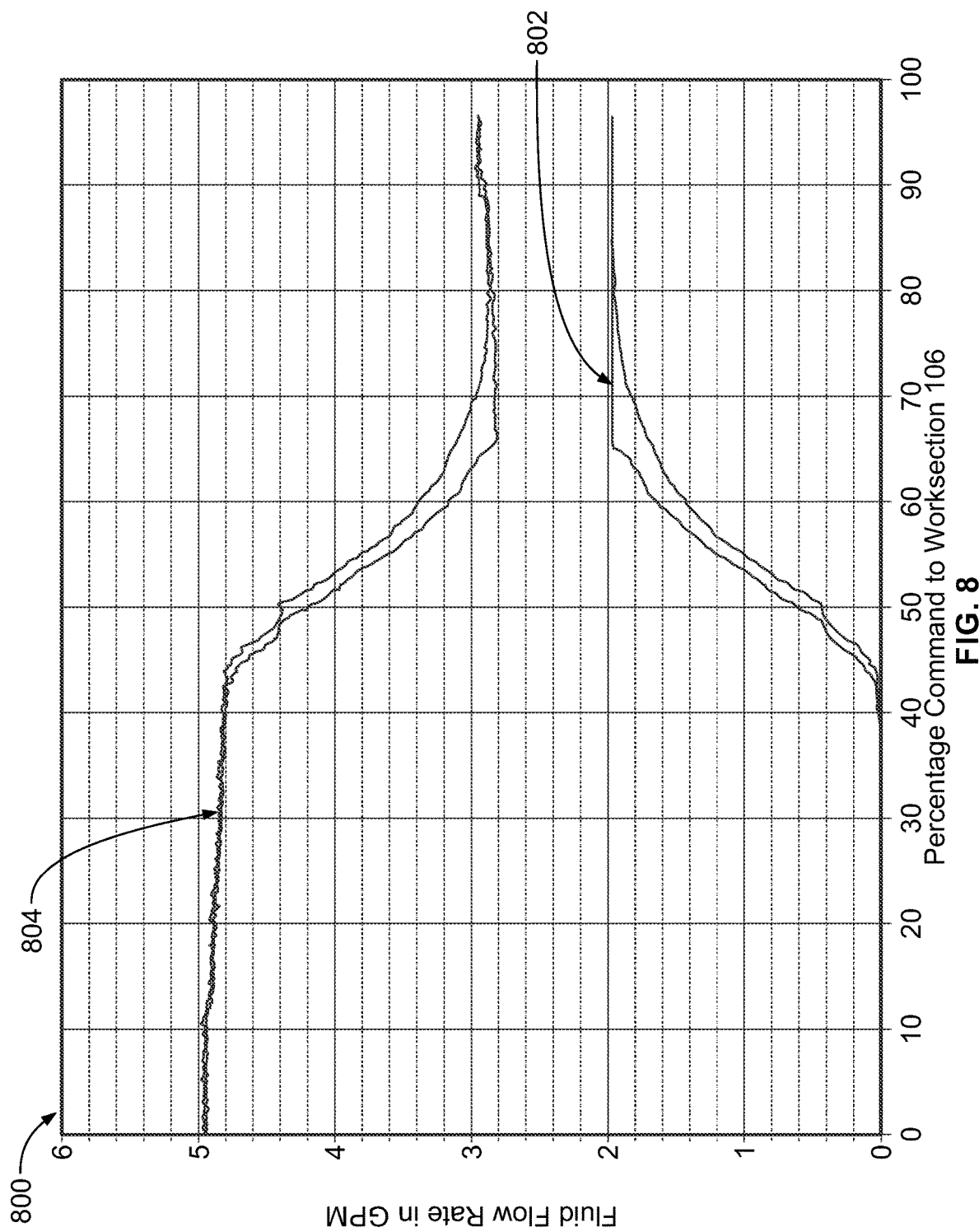
FIG. 8 illustrates a graph associated with experimental results showing flow rate split between worksections when a compensator spring is not used, in accordance with an example implementation.

FIG. 8 illustrates a graph 800 associated with experimental results showing flow rate split between the worksections 106, 108 when the compensator spring 193 is not used, in accordance with an example implementation. The x-axis represents percentage of maximum electric command to the pilot valve 156 of the worksection 106 and the y-axis represents fluid flow rate through the worksections 106, 108 in GPM. Line 802 represents variation in flow rate Q1 through the worksection 106 and line 804 represents variation in flow rate Q2 through the worksection 108 as the magnitude of the command signal to the pilot valve 156 changes.

In this experiment the maximum available flow rate is set to 5 GPM. Initially, the main control spool of the worksection 108 is actuated with a maximum command (e.g., 100% pulse width modulated command to the respective pilot valve) while the main control spool 300 of the worksection 106 is unactuated. In this state, as indicated with the line 804, the maximum available flow rate of 5 GPM is provided through the worksection 108.

When the command signal to the pilot valve 156 of the worksection 106 reaches about 45% of the maximum command and increases therefrom to about 95% of maximum command, the flow rate Q1 through the worksection 106 increases. The command to the pilot valve of the worksection 108 remains at maximum command, and therefore this state simulates a flow over-demand case where the requested flow exceeds the available 5 GPM. In response to such over-demand state, as the flow rate Q1 increases from 0 GPM to about 2 GPM, the flow rate Q2 through the worksection 108 decreases from 5 GPM to about 3 GPM. However, the worksection 108 receives a higher flow rate compared to the worksection 106.

In some examples, it may be desirable to assign the worksection 106 flow priority over the worksection 108. The compensator spring 193 can be added to the pressure compensator valve 184 of the worksection 106 to achieve such flow priority.

Figure 9:
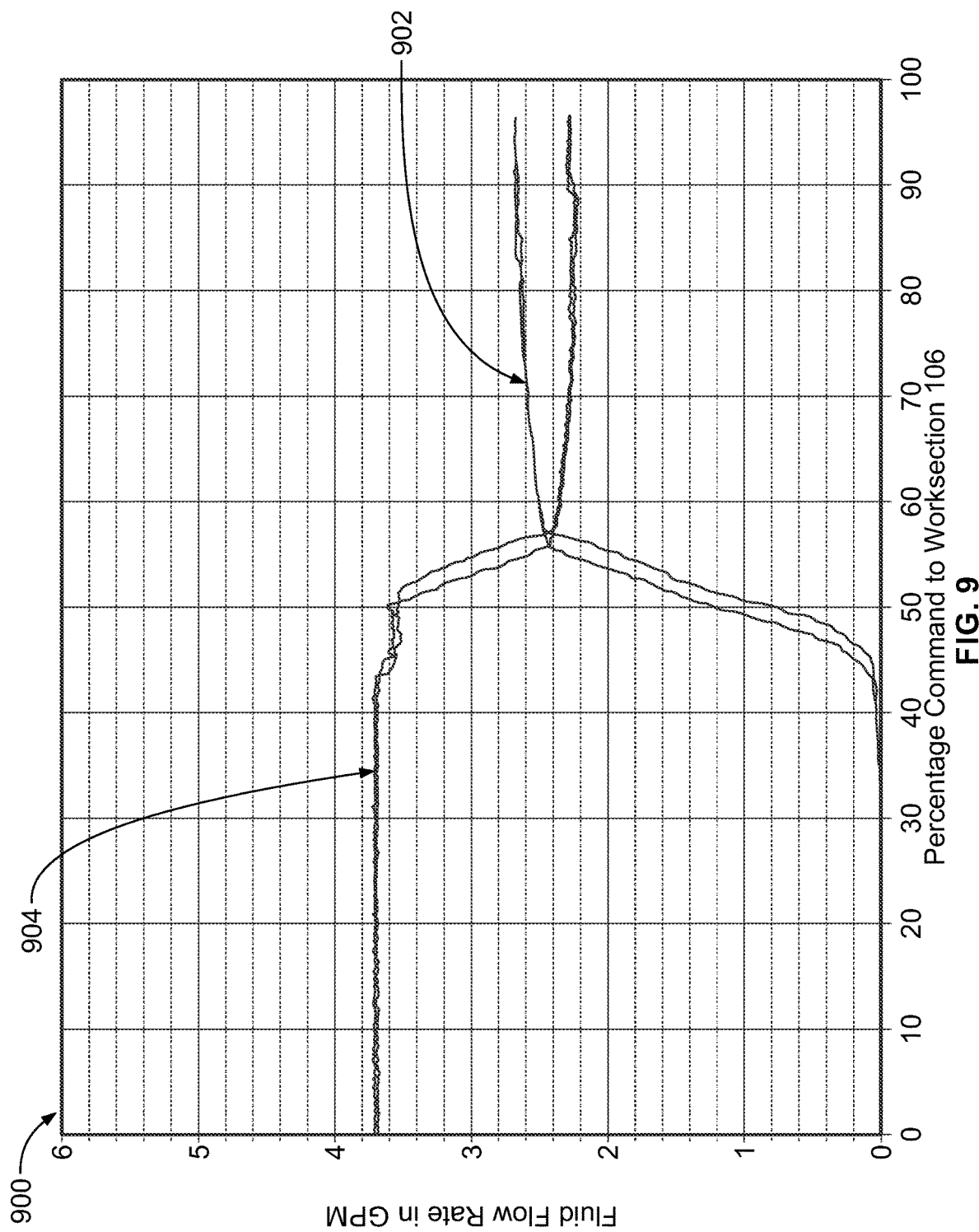
FIG. 9 illustrates a graph associated with experimental results showing flow rate split between a worksections when a compensator spring is used, in accordance with an example implementation.

FIG. 9 illustrates a graph 900 associated with experimental results showing flow rate split between the worksections 106, 108 when the compensator spring 193 is used, in accordance with an example implementation. Line 902 illustrates variation in the flow rate Q1 through the worksection 106 and line 904 represents variation in flow rate Q2 through the worksection 108 as the magnitude of the command signal to the pilot valve 156 changes. The conditions of the test remains the same as the test associated with the graph 800 described above except that the worksection 106 now has the compensator spring 193.

As shown by the lines 902, 904, when the command signal to the pilot valve 156 exceeds about 45% of maximum command, the flow rate Q1 increases while the flow rate Q2 decreases. In contrast to the graph 800, however, the flow rate Q1 through the worksection 106 reaches 2.7 GPM whereas the flow rate Q2 of the worksection 108 decreases to about 2.3 GPM. As such, the worksection 106 has flow priority over the worksection 108 due to using the compensator spring 193 in the pressure compensator valve 184 of the worksection 106.

Figure 10:
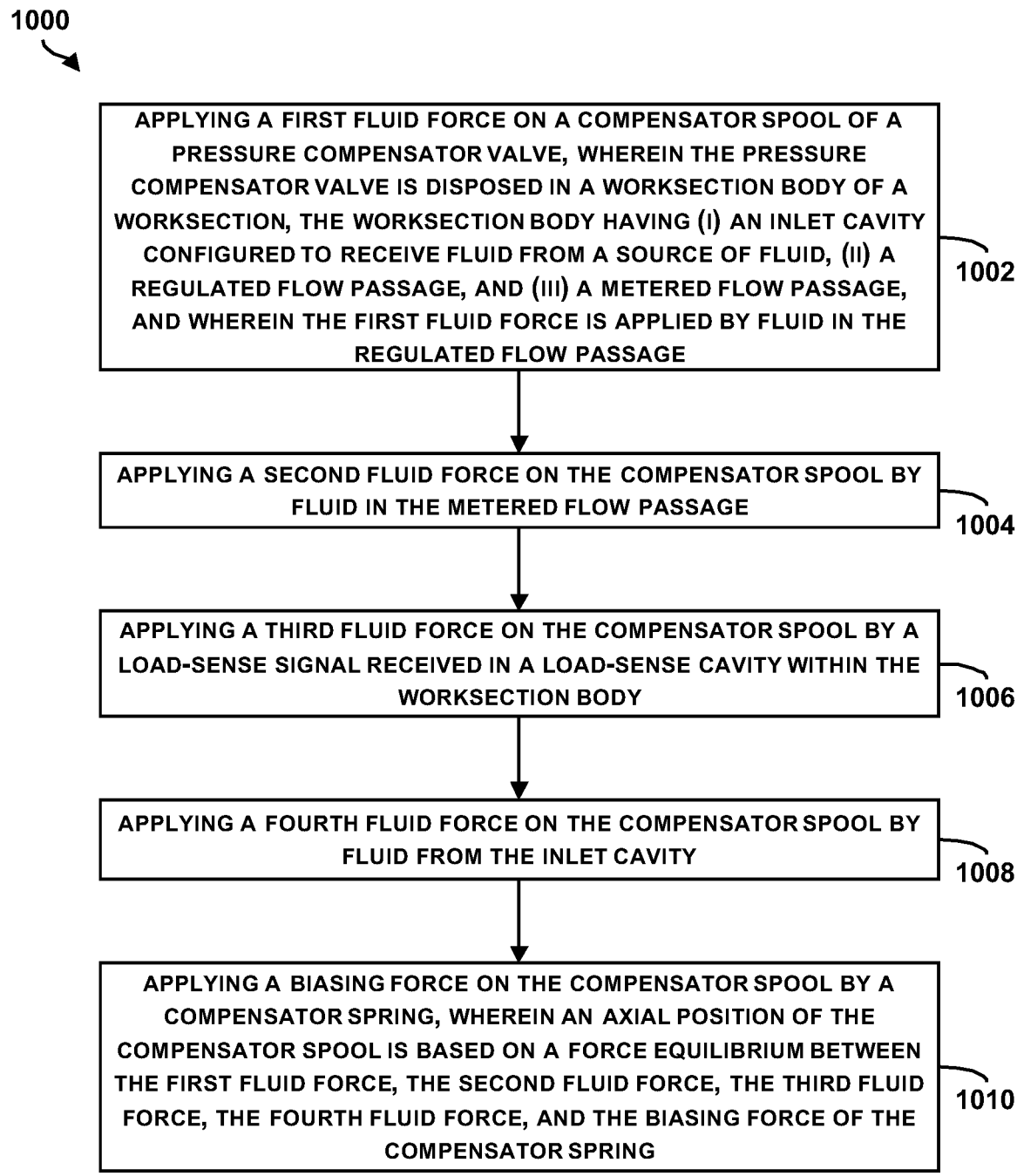
FIG. 10 is a flowchart of a method for operating a pressure compensator valve, in accordance with an example implementation.

FIG. 10 is a flowchart of a method 1000 for operating the pressure compensator valve 184, in accordance with an example implementation.

The method 1000 shown in FIG. 10 presents an example of a method that can be used with the valve assembly 100, the hydraulic system 102, and the pressure compensator valve 184 shown throughout the Figures, for example. The method 1000 may include one or more operations, functions, or actions as illustrated by one or more of blocks 1002-1010. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 1002, the method 1000 includes applying a first fluid force on the compensator spool 316 of the pressure compensator valve 184, wherein the pressure compensator valve 184 is disposed in the worksection body 107 of the worksection 106, the worksection body 107 having (i) the inlet cavity 310 configured to receive fluid from the source 117 of fluid, (ii) the regulated flow passage 314, and (iii) the metered flow passage 326, and wherein the first fluid force is applied by fluid in the regulated flow passage 314.

At block 1004, the method 1000 includes applying a second fluid force on the compensator spool 316 by fluid in the metered flow passage 326.

At block 1006, the method 1000 includes applying a third fluid force on the compensator spool 316 by a load-sense signal received in the valve load-sense cavity 412 within the worksection body 107.

At block 1008, the method 1000 includes applying a fourth fluid force on the compensator spool 316 by fluid from the inlet cavity 310.

At block 1010, the method 1000 includes applying a biasing force on the compensator spool 316 by the compensator spring 193, wherein an axial position of the compensator spool 316 is based on a force equilibrium between the first fluid force, the second fluid force, the third fluid force, the fourth fluid force, and the biasing force of the compensator spring 193.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A pressure compensator valve comprising:
   a compensator spool;
   a first piston, and coupled to a distal end of, and axially-movable with, the compensator spool;
   a second piston disposed in a cavity formed at a proximal end of the compensator spool, wherein the compensator spool is axially movable relative to the second piston;
   a regulated flow passage configured to have fluid being discharged from the pressure compensator valve;
   a metered flow passage configured to be fluidly coupled to a workport of an actuator;
   a compensator inlet cavity configured to receive inlet fluid from a source of fluid;
   a compensator spring applying a biasing force on the compensator spool in an opening direction that allows fluid communication from the compensator inlet cavity to the regulated flow passage, and wherein the compensator spring is disposed in a chamber that is fluidly coupled to the metered flow passage, which is fluidly coupled to the workport of the actuator;
   a compensator plug fixedly disposed adjacent the proximal end of the compensator spool, wherein a proximal end of the second piston contacts, and is secured against, the compensator plug, and wherein a proximal end of the compensator spring rests against the compensator plug, whereas a distal end of the compensator spring contacts the compensator spool; and
   a load-sense cavity configured to receive a global load-sense signal indicative of a highest pressure level among multiple workports, which is different from a pressure level of the chamber of the compensator spring, wherein the global load-sense signal applies a fluid force on the first piston and the compensator spool coupled thereto in a proximal direction.

2. The pressure compensator valve of claim 1, wherein:
   fluid in the regulated flow passage applies a first fluid force on the compensator spool in the proximal direction;
   fluid in the metered flow passage applies a second fluid force on the compensator spool in a distal direction, wherein the fluid force applied by the global load-sense signal on the first piston and the compensator spool in the proximal direction acting is a third fluid force; and
   the inlet fluid applies a fourth fluid force on the compensator spool in the distal direction, wherein an axial position of the compensator spool is based on a force equilibrium between the first fluid force, the second fluid force, the third fluid force, the fourth fluid force, and the biasing force of the compensator spring.

3. The pressure compensator valve of claim 1, wherein the compensator spring is disposed about an exterior surface of the compensator plug, wherein the proximal end of the compensator spring rests against a shoulder formed in the compensator plug.

4. The pressure compensator valve of claim 3, further comprising:
   one or more shims disposed between the shoulder and the proximal end of the compensator spring.

5. The pressure compensator valve of claim 1, wherein the proximal end of the second piston is configured as a spherical surface interfacing with the compensator plug.

6. The pressure compensator valve of claim 1, further comprising:
   a channel that fluidly couples the compensator inlet cavity to the cavity in which the second piston is disposed.

7. The pressure compensator valve of claim 1, wherein the compensator spool is slidable about an exterior surface of the second piston.

* * * * *